United States Patent

Guillaume et al.

[11] Patent Number: 5,113,620
[45] Date of Patent: May 19, 1992

[54] DEVICE FOR CONNECTING A WINDOW-BOTTOM SECTION OF A VEHICAL DOOR TO A SLIDING SECTION OF A WINDOW LIFT, AND VEHICLE DOOR EQUIPPED WITH THIS DEVICE

[75] Inventors: Nicolas Guillaume, Orleans; Philippe Becerril, Darvoy, both of France

[73] Assignee: Rockwell-CIM, France

[21] Appl. No.: 678,505

[22] Filed: Apr. 1, 1991

[30] Foreign Application Priority Data

Apr. 2, 1990 [FR] France ................. 90 04189

[51] Int. Cl.⁵ ............................................. E05F 11/38
[52] U.S. Cl. ................................. 49/375; 49/351; 49/502
[58] Field of Search ............. 49/375, 374, 502 X, 49/351 X, 350

[56] References Cited

U.S. PATENT DOCUMENTS

| | | | |
|---|---|---|---|
| 3,050,332 | 8/1962 | Arnold, Jr. | 49/375 X |
| 4,811,519 | 3/1989 | Gold | 49/375 |
| 4,955,161 | 9/1990 | Bertolini | 49/351 |
| 4,986,030 | 1/1991 | Bertolini et al. | 49/375 X |

FOREIGN PATENT DOCUMENTS 0000417  1/1983  Japan ..................... 49/351

Primary Examiner—Philip C. Kannan

[57] ABSTRACT

The sliding section (4) is fastened to the window-bottom section (6) by means of screws passing through the section (4) and tabs (8) fastened to the section (6); in one of the tabs )8) a downwardly open V-shaped notch (13) is made, the inclined sides (13a, 13b) of which form guiding ramps for a projecting tab (12) of the sliding section (4), permitting the automatic positioning of the section (4) relative to the window-bottom section (6) in such a way that their respective holes for fastening by means of the screws are in perfect coincidence; the arrangement of the means (12, 13) for the automatic centering of the section (4) relative to the section (6) reduces the time required for their assembly on the door assembly line.

3 Claims, 2 Drawing Sheets

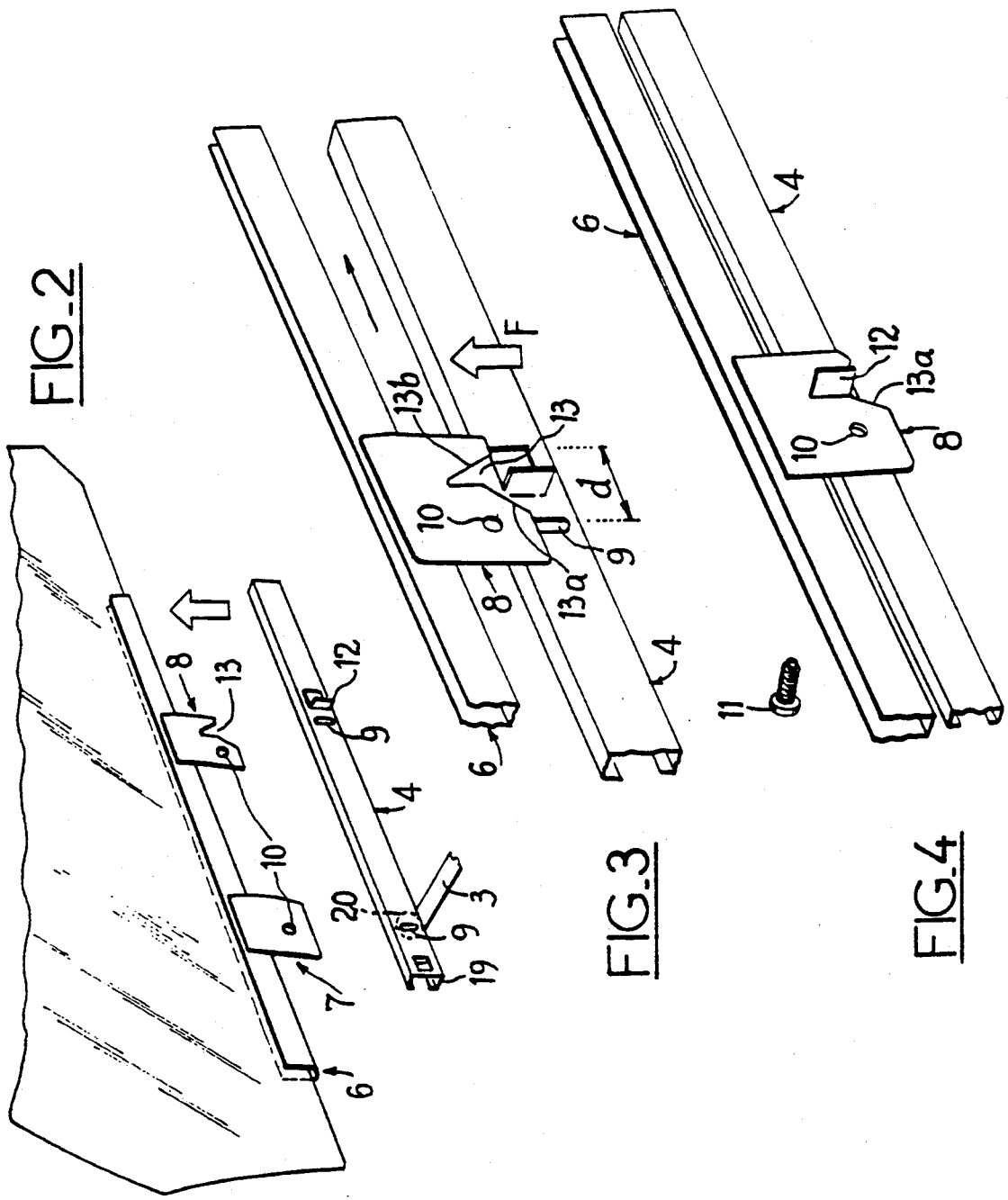

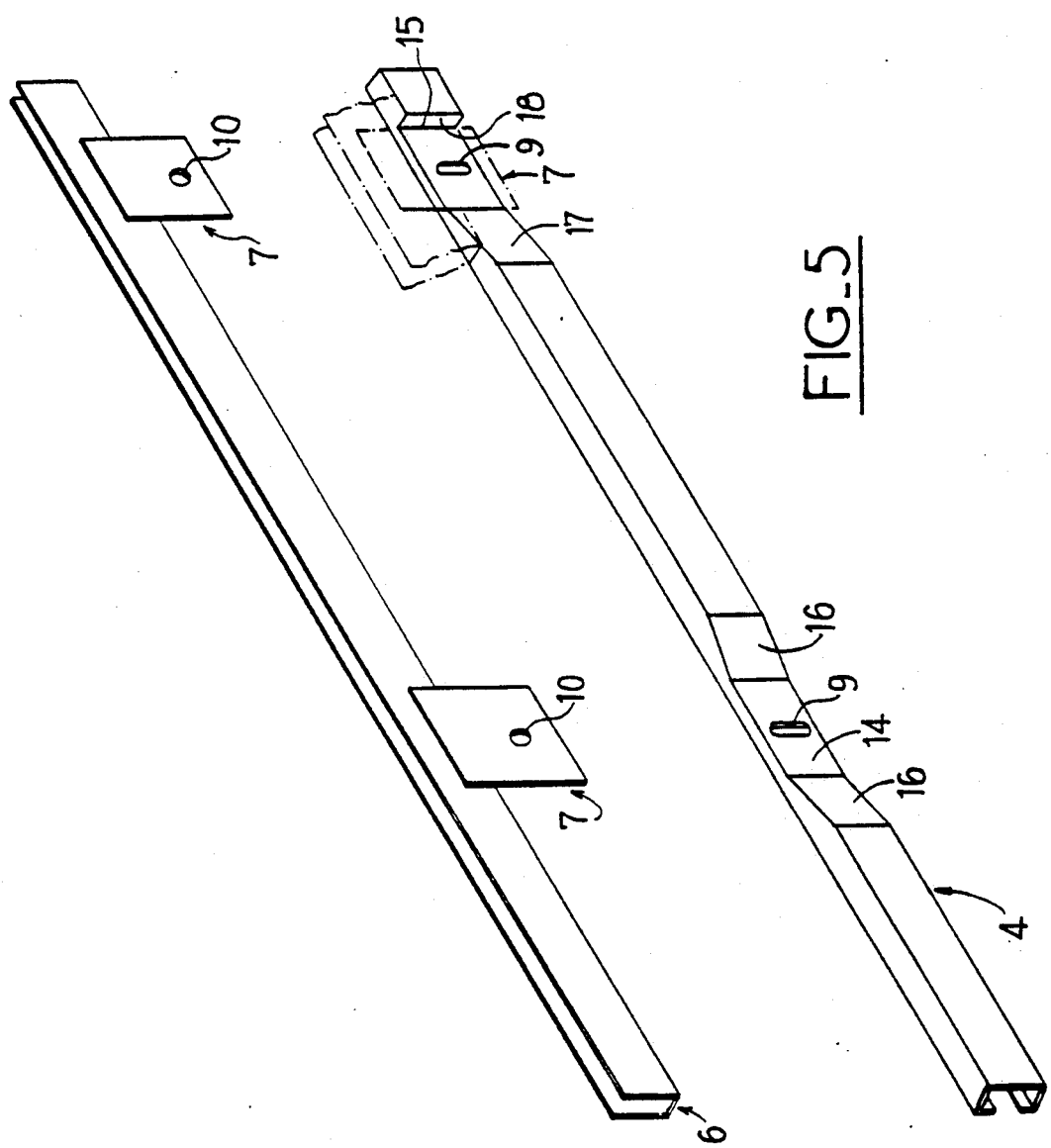
FIG_5

DEVICE FOR CONNECTING A WINDOW-BOTTOM SECTION OF A VEHICAL DOOR TO A SLIDING SECTION OF A WINDOW LIFT, AND VEHICLE DOOR EQUIPPED WITH THIS DEVICE

The subject of the present invention is a device for connecting a window-bottom section of a vehicle door to a sliding section of a window lift, possessing means for fastening the second section to the first. In addition, the invention also relates to a vehicle door equipped with this device.

At present, assembly is effected in the following way:

the operator puts in place the window equipped with its window-bottom section (also called shoe section), on which two tabs are fastened, internally threaded holes being pierced in these tabs;

the operator then immobilises the window in the raised position by any means;

the operator introduces the window lift provided with its sliding section into the door;

the operator recentres or readjusts the position of the sliding section relative to that of the window-bottom section, so as to cause two holes formed in the sliding section to coincide with the two corresponding internally threaded holes of the tabs fastened to the window-bottom section;

finally, the operator puts in place two screws (or any other similar members such as rivets) in order to connect the two sections rigidly via the two tabs.

This method of assembly has the disadvantage that to place the fastening holes of the two sections in coincidence necessitates the manual intervention of an operator, and therefore an increase in the assembly time of the parts on the assembly line. In fact, the assembly technique used hitherto does not permit the connection between the window lift and the window to be performed automatically.

The object of the invention therefore is to permit the centring of the window-lift section relative to the window-bottom section to be performed automatically.

According to the invention, the device for connecting the window-bottom section to the window-lift sliding section comprises means for the automatic centring of the sliding section on the window-bottom section.

According to one embodiment of the invention, the centring means possess a male part integral with the sliding section and a female part integral with the window-bottom section, the female part bearing ramps for guiding the penetration of the male part into the female part when joining the sliding section to the window-bottom section.

According to one embodiment of the invention, the female part is a plate, in which a notch having substantially a V-shaped profile is made, the edges of which notch form the said guiding ramps for the male part, which is formed, for example, by a tab cut out of the sliding section and projecting laterally from the latter, in order to be able to slide on one of the ramps of the downwardly open V-shaped notch when the sliding section is put in place.

According to another feature of the invention, lateral recesses are made in the sliding section, and these recesses are delimited on at least one side by an inclined ramp for guiding a corresponding plate of the window-bottom section.

Under these conditions, since the positioning of the sliding section and its tab has been preset, in a manner known per se, with the aid of a stop of the section cooperating with a roller of the window lift, the tab slides on the ramp when the sliding section is raised, and comes into abutment against the bottom of the notch. Both pairs of fastening holes of the two sections are then in perfect coincidence, and the operator can put the fastening screws in place. Thus, the placing of the sliding section in perfect coincidence with the holes of the window-bottom section can be performed automatically by a robot, thereby reducing the time required for assembly.

Other features and advantages of the invention will become apparent in the course of the description below, which makes reference to the accompanying drawings which illustrate two embodiments of the invention by way of non-limiting examples.

FIG. 1 is a simplified perspective view of a window lift and a window before assembly of their respective sections.

FIG. 2 is a partial perspective view, on an enlarged scale relative to FIG. 1, of a first embodiment of the two sections and their connecting device, before assembly.

FIG. 3 is a perspective view, on a further enlarged scale, of the two sections of FIG. 2 immediately before their assembly.

FIG. 4 is a perspective view of the two sections of FIG. 3 in their assembled position immediately before fitting the fastening screws.

FIG. 5 is a perspective view similar to FIG. 3 of the two sections equipped with a connecting device according to a second embodiment of the invention.

FIG. 1 shows a window lift 1, of the type having arms 2, 3, the upper ends of which carry a sliding section 4, intended to receive rollers (not shown) in a manner known per se, and also a window 5, the horizontal lower edge of which is equipped with a window-bottom section 6, fastened to the said window.

Fastened to the lower edge of the window-bottom section 6 are two tabs 7, 8, each pierced with an internally threaded hole 10. Correspondingly, the sliding section 4 is pierced with two holes 9 spaced apart at a distance equal to that of the holes 10, such that the two sections 4 and 6 can be assembled using suitable members such as screws 11 (FIG. 4) passing through the holes 9 and 10, during the assembly of the elements of the door on the assembly line.

The system for connecting the two sections 4 and 6 comprises means for the automatic centring of the section 4 on the section 6, which in the example illustrated in FIGS. 2 to 4 are constituted in the following way.

The sliding section 4 possesses a male part consisting of a tab 12 cut out of the wall of the section 4 and folded back laterally at right angles. For its part, the window-bottom section 6 carries a female part consisting, in this example, of one of the tabs 8, in the lower edge of which a notch 13 having substantially an inverted V-shaped profile has been made. The edges 13a, 13b of this notch form ramps for guiding the projecting tab 12 and therefore the sliding section 4, when the latter is displaced upwards as indicated by the arrow F. The guiding ramps 13a and 13b do not have to be identical, however, as shown in FIGS. 2 and 3, where it can be seen that the left-hand ramp 13a is in two portions: the first portion, joined to the horizontal lower edge of the tab 8 has an inclination to the horizontal which is less than that of the second portion, which ends in the vertex of the V, in order to facilitate the sliding of the tab 12 on the first portion of the ramp 13a.

The section 4 is provided in a manner known per se, at one of its ends, with an inner stop 19 adapted to cooperate with a roller 20 carried by one of the arms 2, 3, for example the arm 3, in order to preset the position of the section 4 relative to that of the section 6.

The assembly of the two sections 4 and 6 can be carried out automatically in a very simple way: since the V formed by the notch 13 is downwardly open and the section 4 is initially positioned as indicated above, by the roller 20 coming into contact with the limit stop 19, its projecting tab 12 is situated within a region of width d equal to the distance between the opposite edges of the notch 13; the section 4 is then displaced upwards (arrow F). As a result, the sliding of the tab 12 on the two successive portions of the ramp 13a, or on the second ramp 13b, brings the tab 12 into abutment in the bottom of the notch 13, and consequently positions the section 4 in such a way that its holes 9 are in exact coincidence with the internally threaded holes 10 of the section 6 (FIG. 4). It only remains then for the operator to put the screws 11 (or optionally other fastening members) in place in the holes 9 and 10.

In the second embodiment of the invention, shown in FIG. 5, the window-bottom section 6 carries two identical tabs 7, whereas in the sliding section 4 two lateral recesses 14 and 15 are made. The recess 14 is formed in the region of the section 4 corresponding to the position of the left-hand plate 7 when the two sections 4 and 6 are assembled, whereas the recess 15 is formed at the end of the section 4, situated facing the second plate 7. The recess 14 is delimited on each side, in the longitudinal direction of the section 4, by two ramps 16 inclined towards one another and symmetrical relative to a transverse plane passing through the centre of the back of the recess 14 linking these ramps 16. The terminal recess 15 is delimited on one side by an inclined ramp 17 and on the other side by a projecting tab 18, folded back at right angles and capable of forming a limit stop for the corresponding plate 7.

The assembly of the two sections 4 and 6 is carried out in the following way: with the section 6 being held fixedly, the section 4 is raised in such a way that the recesses 14, 15 come substantially into a position facing the tabs 7. Owing to the offset in the longitudinal direction (taken to be towards the left in the drawing) between the tabs 7 and the recesses 14, 15, the tabs 7 slide on the ramps 16 and 17 until they come to bear on the backs of the recesses 14, 15, this longitudinal displacement of the section 4 being arrested by the stop consisting of the tab 18, and when the tabs 7 come to bear on the flats consisting of the recesses 14 and 15. At this moment, the holes 9 and 10 are in perfect coincidence and the operator can put the screws 11 in place.

The invention is not limited to the embodiments described and may include variants. Thus, it is obvious that the profiles of the ramps 13a and 13b can vary, provided that these ramps retain their function of guiding the displacement of the section 4 relative to the section 6. The invention is applicable to the various existing types of window lift; window lifts with arms (FIG. 1), cable-rack or cable.

We claim:

1. Device for connecting a window-bottom section (6) of a vehicle door to a sliding section (4) of a window lift (1), possessing means for fastening the second section (4) to the first (6), characterised in that it comprises means (12, 13) for the automatic centering of the sliding section (4) on the window-bottom section (6), said centering means possess a male part (12) integral with the sliding section (4) and a female part (8) integral with the window-bottom section (6), the female part bearing ramps (13a, 13b) for guiding the penetration of the male part (12) into the female part (8) when joining the sliding section to the window-bottom section, said female part is a plate (8), in which a notch (13) having substantially a V-shaped profile is made, the edges (13a, 13b) of which notch form the said guiding ramps for the male part (12), which is formed, for example, by a tab cut out of the sliding section (4) and projecting laterally from the latter, in order to be able to slide on one (13a or 13b) of the ramps of the downwardly open V-shaped notch (13) when the sliding section (4) is put in place.

2. Device according to claim 1, in which the window-bottom section (6) carries plates (7) pierced with holes (10) for receiving elements (11) for the assembly of the two sections (4, 6), characterised in that in the sliding section (4) lateral recesses (14, 15) for supporting the plates (7) are made, the said recesses being delimited on at least one side by an inclined ramp (16, 17) for guiding a corresponding plate (7) of the window-bottom section (6).

3. Device according to claim 2, characterised in that one (14) of the recesses (14, 15) is delimited on its second side by a second inclined guiding ramp (16), whereas the second recess (15) is delimited on the side opposite its guiding ramp (17) by a projecting tab (18) forming a limit stop for the corresponding plate (7), when the latter comes to bear against the back of the recess (15).

* * * * *